United States Patent
Espe

(10) Patent No.: US 9,962,862 B2
(45) Date of Patent: May 8, 2018

(54) METHOD FOR PRODUCING A HYDROPHOBIC OR SUPERHYDROPHOBIC SURFACE TOPOGRAPHY

(71) Applicant: HUECK Rheinische GmbH, Viersen (DE)

(72) Inventor: Oliver Espe, Bochum (DE)

(73) Assignee: HUECK Rheinische GmbH, Viersen (DE)

(*) Notice: Subject to any disclaimer, the term of this patent is extended or adjusted under 35 U.S.C. 154(b) by 166 days.

(21) Appl. No.: 14/912,968

(22) PCT Filed: May 20, 2014

(86) PCT No.: PCT/EP2014/001348
§ 371 (c)(1),
(2) Date: Feb. 19, 2016

(87) PCT Pub. No.: WO2015/024609
PCT Pub. Date: Feb. 26, 2015

(65) Prior Publication Data
US 2016/0193868 A1 Jul. 7, 2016

(30) Foreign Application Priority Data
Aug. 21, 2013 (EP) .................................. 13004134

(51) Int. Cl.
*B29C 33/38* (2006.01)
*B30B 5/04* (2006.01)
(Continued)

(52) U.S. Cl.
CPC .......... *B29C 33/3857* (2013.01); *B23K 26/00* (2013.01); *B23K 26/0084* (2013.01);
(Continued)

(58) Field of Classification Search
CPC ............ B29C 33/3842; B29C 33/3857; B29C 33/3892
(Continued)

(56) References Cited

U.S. PATENT DOCUMENTS 6,660,363 B1 12/2003 Barthlott
2004/0118813 A1 6/2004 Lai
(Continued)

FOREIGN PATENT DOCUMENTS

CH 268 258 A 8/1950
CN 101175605 A 5/2008
(Continued)

OTHER PUBLICATIONS

International Search Report of PCT/EP2014/001348, dated Sep. 30, 2014.
(Continued)

*Primary Examiner* — Timothy Kennedy
(74) *Attorney, Agent, or Firm* — Collard & Roe, P.C.

(57) ABSTRACT

A method for producing a hydrophobic or superhydrophobic surface topography on a smooth or structured surface of a pressing tool in the form of a pressing plate, endless belt, or embossing roller for producing material plates, plastic films, separating films, PVC surfaces, and LVTs (luxury vinyl tiles), includes the following steps: preparing a surface template having a microstructure, making an impression of the surface using a resin, scanning the molded surface using a 3-D microscope, converting the digitalized data from the scanning process with depth measurement into grayscale bitmaps, using the grayscale bitmaps to control the machining process of an abrasive surface treatment or to apply a mask for chemically processing the pressing tool in order to produce the surface topography. For this purpose, either the pressing tool is partially covered with a mask and subjected
(Continued)

Figure 1:
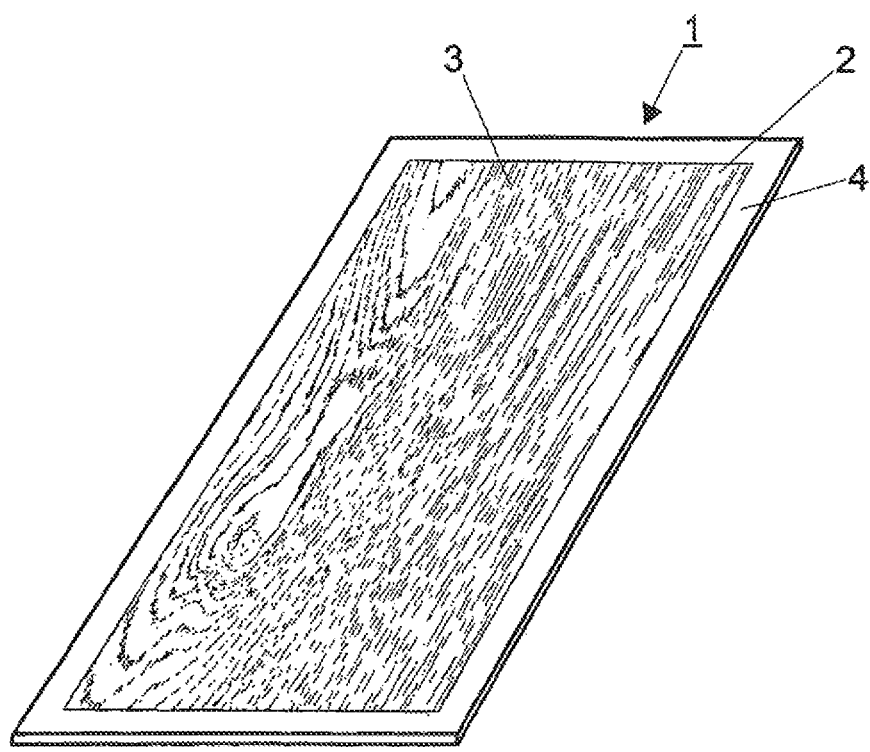

to an etching operation or the determined grayscale bitmap data are used to control an abrasive machining head.

12 Claims, 4 Drawing Sheets

(51) Int. Cl.
| | | |
|---|---|---|
| *B44B 5/02* | (2006.01) | |
| *B44C 5/04* | (2006.01) | |
| *B44F 9/00* | (2006.01) | |
| *B44C 1/22* | (2006.01) | |
| *B30B 15/06* | (2006.01) | |
| *B30B 3/00* | (2006.01) | |
| *B23K 26/352* | (2014.01) | |
| *B23K 26/00* | (2014.01) | |
| *B29C 33/42* | (2006.01) | |
| *B44F 9/02* | (2006.01) | |
| *B29C 59/02* | (2006.01) | |
| *B29C 59/04* | (2006.01) | |
| *B29L 31/00* | (2006.01) | |

(52) U.S. Cl.
CPC ........ *B23K 26/352* (2015.10); *B29C 33/3842* (2013.01); *B29C 33/424* (2013.01); *B30B 3/005* (2013.01); *B30B 5/04* (2013.01); *B30B 15/062* (2013.01); *B44B 5/026* (2013.01); *B44C 1/221* (2013.01); *B44C 1/227* (2013.01); *B44C 1/228* (2013.01); *B44C 5/04* (2013.01); *B44F 9/00* (2013.01); *B44F 9/02* (2013.01); *B23K 26/0078* (2013.01); *B29C 59/04* (2013.01); *B29C 2059/023* (2013.01); *B29L 2031/757* (2013.01)

(58) Field of Classification Search
USPC .................. 264/220, 224, 225, 226, 227
See application file for complete search history.

(56) References Cited

U.S. PATENT DOCUMENTS

| | | | |
|---|---|---|---|
| 2005/0181310 | A1 | 8/2005 | Yang et al. |
| 2007/0057403 | A1* | 3/2007 | Nielson .................. A45D 31/00 |
| | | | 264/222 |
| 2010/0006542 | A1 | 1/2010 | Reichert |
| 2011/0048254 | A1 | 3/2011 | Espe et al. |
| 2011/0287203 | A1 | 11/2011 | Victor et al. |
| 2015/0064400 | A1 | 3/2015 | Stoffel |
| 2015/0158330 | A1 | 6/2015 | Stoffel et al. |

FOREIGN PATENT DOCUMENTS

| | | |
|---|---|---|
| CN | 101861411 A | 10/2010 |
| DE | 1 023 217 B | 1/1958 |
| DE | 10 2006 022722 A1 | 11/2007 |
| DE | 20 2012 004375 U1 | 6/2012 |
| EP | 0 772 514 B1 | 5/1997 |
| EP | 2 289 708 A1 | 3/2011 |
| EP | 2 679 402 A1 | 1/2014 |
| JP | 3-174279 A | 7/1991 |
| JP | H6-219447 A | 8/1994 |

OTHER PUBLICATIONS

Response to the European Patent Office regarding PCT/EP2014/001348 dated Sep. 25, 2015 with an English translation of the relevant parts.

* cited by examiner

METHOD FOR PRODUCING A HYDROPHOBIC OR SUPERHYDROPHOBIC SURFACE TOPOGRAPHY

CROSS REFERENCE TO RELATED APPLICATIONS

This application is the National Stage of PCT/EP2014/001348 filed on May 20, 2014, which claims priority under 35 U.S.C. § 119 of European Application No. 13004134.6 filed Aug. 21, 2013, the disclosure of which is incorporated by reference. The international application under PCT article 21(2) was not published in English.

The invention relates to a method for producing a hydrophobic or superhydrophobic surface topography on a smooth or structured surface of a pressing tool in the form of a pressing plate, endless belt or embossing roller for producing material, plates, plastic films, separating films, PVC surfaces and LVTs (luxury vinyl tiles).

Pressing tools of the generic type are needed to produce material plates, for example, which comprise a substrate layer, preferably a wood substrate layer, on which paper sheets impregnated with resin are laid. At least one decor paper and an overlay paper are used for this purpose if, for reasons pertaining to the manufacturing process, both an underlay and an overlay paper are not necessary or optionally several overlay papers with corundum in order to improve the wear resistance of the surfaces.

To prevent the material plates from buckling, it is preferable to face both sides with more or less the same number of overlay and underlay papers.

The material plates are heated and pressed in pressing machines so that the thermosetting resins, for example in the form of amino resins, are cured. The surface structure of the pressing plates is applied to the material plates during the curing process to impart to them not only the desired, wood grain pattern but also a relief-type depth structure in register with the decor paper. To this end, the paper layers are impregnated with thermosetting resins, not only to enable curing but also to render the individual paper layers transparent at the same time so that the decorative layer of the finished products, i.e. the material plates, shows through. The substrate layer of the material plates preferably comprises wood substrates or paper layers, which are faced with the impregnated and printed paper webs and pressed in pressing machines by means of appropriate pressing plates made from steel or brass. The pressing plates may have a smooth or structured surface, depending on the customer's requirements. The surfaces are then usually plated with chromium to obtain good release properties from the thermosetting resins and also to create a surface hardness that will permit as many pressing operations as possible with one and the same pressing tool. The chromium layer also protects the structured surface from damage.

The wood substrate layers may be HDP, MDF, OSB, chipboard or plywood boards, whereas the HPL boards are multi-layered paper webs, for example made from kraft and alpha pulp papers which are in turn printed or manufactured in a single color. Many and varied designs can be obtained using decor papers, including, for example, imitations of stone, leather, fabric or wood, and after the pressing operation with the pressing plates used for this purpose, which are provided with a synchronously applied structure, the structure is superimposed on the individual decorative elements, i.e. by in-register embossing, so that the recesses conform to the pattern of the wood grain for example, making the material plates particularly naturalistic. When producing laminate flooring, the decorative structures are pressed by means of a synchronously running structure on the pressing plate in the pressing machines for example, thereby making the imitation wood particularly realistic. Another option based on special treatments of the pressing tools is to create different degrees of gloss in parts of the surface so that the deeper lying layers of the pressed material plates have a lower or optionally higher degree of gloss than the surrounding areas. The finished material plates may be used. In the furniture industry on the one hand and for interior construction on the other hand, namely for flooring panels as well as wall and ceiling cladding.

Unfortunately, surfaces of this type have proved difficult to clean. If working with cleaning products containing water, problems occur in particular in floor areas where the laminate boards are joined by their tongue and groove. Although the joins are usually sealed, penetration by water causes a swelling in the thickness of the substrate layer, especially in the case of a wood substrate, and leads to cupping and differences in thickness which are undesirable.

Specific structures used for furniture or wall and ceiling panels are almost always mechanically cleaned, which damages the surfaces. The cleaning of structured and smooth melamine resin surfaces is a problem that has not been satisfactorily resolved to this day and requires improvement.

European application EP 0 772 514 B1, for example, proposes a cleaning-friendly surface in which the structural elevations are made from hydrophobic polymers or materials that have been made durably hydrophobic.

An approach known from CH-PS-26 82 58 is to produce a water-repellent surface which forms a contact angle of 120° with water, which reduces dirt. The surface in this instance is achieved by additionally applying a layer of powder such as kaolin, talcum, clay or silica gel, and the powder is rendered hydrophobic beforehand by means of organic silicon compounds.

The technologies described above do not relate to melamine resin surfaces and cannot be used for the intended purpose due to the additional application of plastic layers.

In addition to producing material plates predominantly for use in the furniture industry or for interior construction, the pressing tools can also be used to make plastic films with a hydrophobic or superhydrophobic surface topography. Instead of plastic films, the same method can be used for producing separating films, PVC surfaces and vinyl tiles (LVT).

To make the production of hydrophobic or superhydrophobic surface topographies using pressing tools easier, the underlying objective of this invention is to propose a new method of producing pressing tools, by means of which the surfaces of the flooring, furniture, ceiling, wall and HPL panels, plastic films, separating films, LVTs (luxury vinyl tiles) and PVC surfaces can be provided with a cleaning-friendly surface.

To achieve this objective, the invention proposes using a method of producing a hydrophobic or superhydrophobic surface topography on a smooth or structured surface of a pressing tool in the form of a pressing plate, endless belt or embossing roller, which method comprises the steps:
  preparing a surface template having a microstructure,
  making an impression of the surface by means of a resin,
  scanning the molded surface by means of a 3-D microscope,
  converting the digitized data from the scanning process with depth measurement into grayscale bitmaps,
  using the grayscale bitmaps to control the treatment process of an abrasive surface treatment or to apply a mask for chemically processing the pressing tool in order to produce the surface topography.

Other advantageous embodiments of the invention are defined in the dependent claims.

Extensive tests of surfaces structured in this manner have shown that a specific surface topography has a self-cleaning effect when it becomes dirty. The surface topography of known structures that occur in nature is used for this purpose, such as that which occurs in the case of lotus or cabbage leaves or other similarly structured plant leaves, for example. Alternatively, another option is to mimic the surface structure of an exoskeleton of beetles. To this end, the natural template is prepared first of all so that the impression of the surface can be made by means of a cast resin without damaging the surface to obtain a true to life reproduction. Once the cast resin has cured, a negative mold is created which is used for making the impression of the surface. The impression and hence digitization of the surface is prepared by means of a 3-D microscope, which determines the digitized data of the surface template that will be necessary for the other process steps. 3-D microscopes sold by the Keyence company, for example, are suitable for this purpose.

The advantage of 3-D microscopes is that not only the two-dimensional surface is detected but also the depth of the surface template which is ultimately to be represented on the surfaces of the pressing tools. In this respect, it is perfectly possible to use digitized data additionally obtained by means of a 3-D scanner, in which case the data of the 3-D scanner as well as that of the 3-D microscope can then be used to produce the grayscale bitmaps.

Based on the method proposed by the invention, the microstructure known from nature can be detected by scanning with a 3-D microscope to obtain digitized data which is converted into grayscale bitmaps. The grayscale bitmaps are then used to control the treatment process of an abrasive surface treatment or for applying a mask for chemically processing the pressing tool. With the aid of the method, therefore, the surface topography can be produced both on smooth or structured surfaces of a pressing tool. Using the 3-D microscope means that not only the two-dimensional structure but also in addition the depth of the surface template can be detected. The depth of the surface template is then subsequently used during an abrasive surface treatment, for example, to control a laser beam, a water jet or to carry out other abrasive techniques. If the surface of the pressing tool is to be chemically treated, a mask can be applied with the aid of the digitized data (grayscale-bitmaps), in which case the duration of etching is determined on the basis of the detected depth.

A mask is preferably applied for the purpose of a chemical surface treatment, i.e. for etching the surface of a pressing tool. The mask can be applied to a smooth plate but likewise to an already structured surface of a pressing tool in order to produce the microstructure of the hydrophobic or superhydrophobic surface topography. The mask applied for this purpose is preferably made from a UV coating which is at least partially but preferably completely cured by a UV lamp in order to guarantee that it will be capable of withstanding an etch bath. Once etching is complete, the mask is removed so that other treatment steps can be carried out if necessary.

Having completed the etching process and removed the mask, the surface structure may additionally be electropolished or mechanically polished in order to additionally smooth the resultant structure. The last process step as a rule, finally, is hard chrome plating so that the pressing tools can then be placed in a hydraulic single or multi-stage hot press where the requisite substrate is faced on the top and bottom faces with the decor papers impregnated with melamine resin using edge pressing techniques and the negative structured surface of the pressing tools is reproduced on the plate surface so that the surface of the impression of the structured template corresponds to the surface topography. Surfaces produced in this manner are very easy to clean, and in particular particles of dirt adhere less stubbornly to the surfaces and can thus be more easily removed. The method proposed by the invention may be used for stainless steel endless belts, pressing plates and embossing rollers.

If necessary, in order to increase the accuracy of the structuring within the surface, a 3-D scanner may be used in addition, in which case a combination of data from the 3-D scanner and the 3-D microscope may be used to produce the grayscale bitmaps.

Based on another embodiment of the method, instead of applying a mask, the surface of the pressing tool may be provided with an etch-resistant protective layer on at least part, but preferably its entire surface and the protective layer is then partially removed with the aid of a laser controlled by means of the grayscale bitmaps. A pressing tool pre-treated in this manner can then be subjected to an etching process and only the exposed metal surfaces are etched. The advantage of the method is that the intensity of the laser beam may be substantially lower than would be the case if treating the metal surface directly. As a result, at a higher intensity of the laser beam, the processing times of the pressing plates can also be very much reduced. Another advantage is that the pressing tools to be treated can be made to a standard length of 7 to 14 meters without repeats. By using a laser exactly controlled by the digitized data of the grayscale bitmaps to remove the protective layer, a high degree of accuracy and reproducibility can be achieved. To avoid edges of the etching mask that are not cleanly etched, it is preferable to use a laser with a wavelength in the infrared range. Such lasers couple only very slightly into the metal surface so that little heat is dissipated on the surface of the pressing tool. As a result, the properties of the metal surface of the pressing tool remain unaffected, offering the advantage of an exact and reproducible etching mask structure, and the laser burns off only the protective layer corresponding to the desired surface topography resulting in partial exposure of the metal surface of the pressing tool for etching.

Once the protective layer has been removed by means of a laser, a micro-structured surface can be produced by means of an etching process. The requisite etching time is determined on the basis of the depth of the surface template. In this manner, a surface topography can be produced which mimics the selected surface template as far as possible.

In order to produce the microstructure which, predominantly comprises annular, repeating recesses in the selected templates, at least some of the protective layer can be removed in order to produce micro-structuring in the form of approximately round or circular etchings. The etchings to be produced may be spaced apart from one another, for example, but may also touch one another in the circumferential region or at least partially overlap. A laser lends itself extremely well to producing these etchings, which may individually have a size of up to 10 m, because it is perfectly capable of burning such small structures out of the applied protective layer. For all the reasons outlined above, the laser method is a very good method for producing the microstructuring.

An alternative option instead of using a mask is to use the digitized data (grayscale bitmaps) obtained by the method directly as a means of providing structuring, for example using a laser or a water jet device. The abrasive treatment of the surface of the pressing tool. In this instance takes place on a workbench, which offers the possibility of fixing the position of the pressing tool and the processing head can be moved in an X and Y plane by means of drive units or, if using a stationary processing head, the workbench can be moved. The dwell time of the abrasive tool, for example a water jet, or the dwell time, focus and/or intensity of a laser beam are also determined on the basis of the grayscale bitmaps. It is preferable to use the data determined from the depth measurement taken by the 3-D microscope for this purpose. For example, the dwell time, focus und intensity of the laser beam can be exactly controlled on the basis of the depth. The same applies if using a water jet device, in which case the dwell time can be controlled depending on a matrix point of the surface.

The surface structure obtained in this manner can then m turn be electro-polished, or mechanically polished in order to impart additional smoothness to the structure if necessary. As a rule, this is then followed by the last process step, namely hard chrome plating in order to produce the surface hardness that will enable the pressing tool to withstand a sufficient number of pressing operations.

The described method is used to produce a hydrophobic or superhydrophobic surface topography to improve the cleaning effect. These method steps can be applied to both a smooth pressing tool and a structured pressing tool which is then used in a hydraulic single or multi-stage hot press. In the case of smooth pressing tools, these are merely provided with the desired microstructure of the surface topography.

In the case of structured pressing tools, on the other hand, which reproduce a wood grain for example, the hydrophobic or superhydrophobic microstructure is additionally applied once the structuring steps have been completed in order to impart to the desired cleaning effect to these pressing tools.

These method steps preferably replace a partial adjustment to the degree of gloss. However, this does not rule out the fact that the final process of hard chrome plating can be implemented in such a way that different degrees of gloss can be produced in partial regions by differing hard chrome plating or the hard chrome plating is then treated again in partial regions to adjust the degree of gloss. Using digital printing, instead of pro viding full-surface hard chrome plating, it is possible to provide a partial hard chrome plating of the surface topography as an additional surface treatment. These might be layers of chromium with a different surface roughness and thus a different degree of gloss. An alternative option after completing the hard chrome plating is to provide a full-surface or partial adjustment to the degree of gloss as another surface treatment. For this purpose, the pressing tool can be partially covered by means of a mask so that the exposed regions not covered by the mask can be subjected to additional processing steps, which might be another chemical method step, electro-polishing or mechanical polishing, for example.

In order to make an impression of natural surface templates, it is preferable to use an epoxy resin or silicone resin because this will not damage the surface and will provide a true to life reproduction, and in particular silicone resins with ultrafine additives are best suited to this purpose when it comes to reproducing fine structures.

Pressing tools produced in this manner can be used for embossing material plates but also for embossing plastic films, separating films, LVT products (luxury vinyl tiles) and PVC surfaces for flooring, wall cladding panels and furniture.

Another objective of the invention is to propose a device which can be operated by the method.

In order to achieve the device objective, a support device for the pressing tools is provided, which either has a stationary processing head and the support device can be moved in the X and Y direction by means of drive units or the processing head can be moved by drive units in the direction of the X and Y co-ordinates within a spanned plane, and the grayscale bitmaps are used to activate the surface treatment and the speed of either the processing head or the support device can be controlled by the detected depth of the surface template, and in the case of an abrasive treatment of the surface of the pressing tool, the dwell time of the abrasive tool, for example a water jet, or the dwell time, focus and/or intensity of a laser beam depend on the grayscale bitmaps and the depth detected by means of the 3-D microscope. Alternatively, the processing head may be used to remove a protective layer applied to the full surface and the duration of the subsequent etching process can be set on the basis of the depth detected by the 3-D microscope.

The invention further relates to the use of a pressing plate, endless belt or a cylindrical embossing roller as a pressing tool, produced by the method proposed by the invention for pressing and/or embossing material plates, plastic films, separating films, PVC surfaces, LVTs (luxury vinyl tiles) with a smooth or true to life structured surface to a depth of up to 500 pm, and on the basis of predefined digitized data of the grayscale bitmaps of a template molded from a 3D-surface template and the depth detected by means of a 3-D microscope are used to produce a hydrophobic or superhydrophobic surface topography on a smooth or structured surface. Using a pressing tool produced in this manner which can be used in single or multi-stage hot presses also enables a material plate with a hydrophobic or superhydrophobic surface topography to be produced.

This invention essentially offers the possibility of firstly providing the pressing tools and, after pressing, imparting micro-structuring to the surface of material plates having hydrophobic or superhydrophobic properties. This makes the adhesion of dirt particles much more difficult so that cleaning of such surfaces is made much easier and more effective. For this purpose, an impression is made of such a structured microstructure taken from nature, and is so preferably with the aid of a 3-D microscope, in order to transfer the fineness of the structure, particularly in terms of depth, to the pressing tool and hence to the material plate. The material plates produced by the method are extremely suitable for producing furniture, flooring, ceiling and wall panels, as well as HPL boards. Another option is to use the pressing tools for embossing plastic films, separating films, PVC surfaces and LVTs (luxury vinyl tiles) which can be used for floors and walls.

The invention will be explained in more detail with reference to the appended drawings.

Of these

Figure 2:
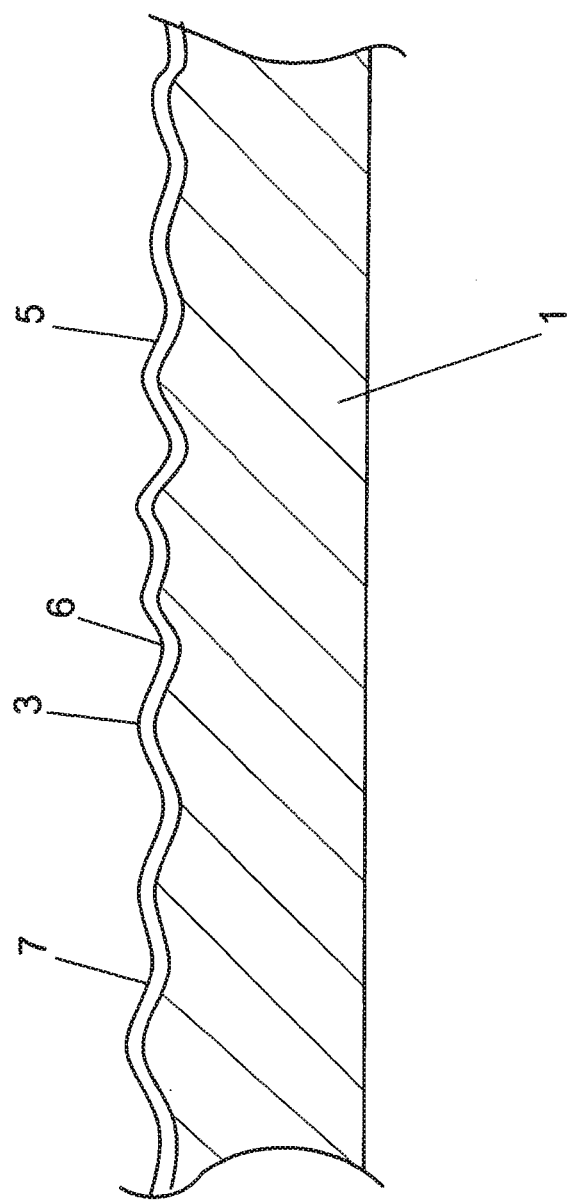
Figure 3:
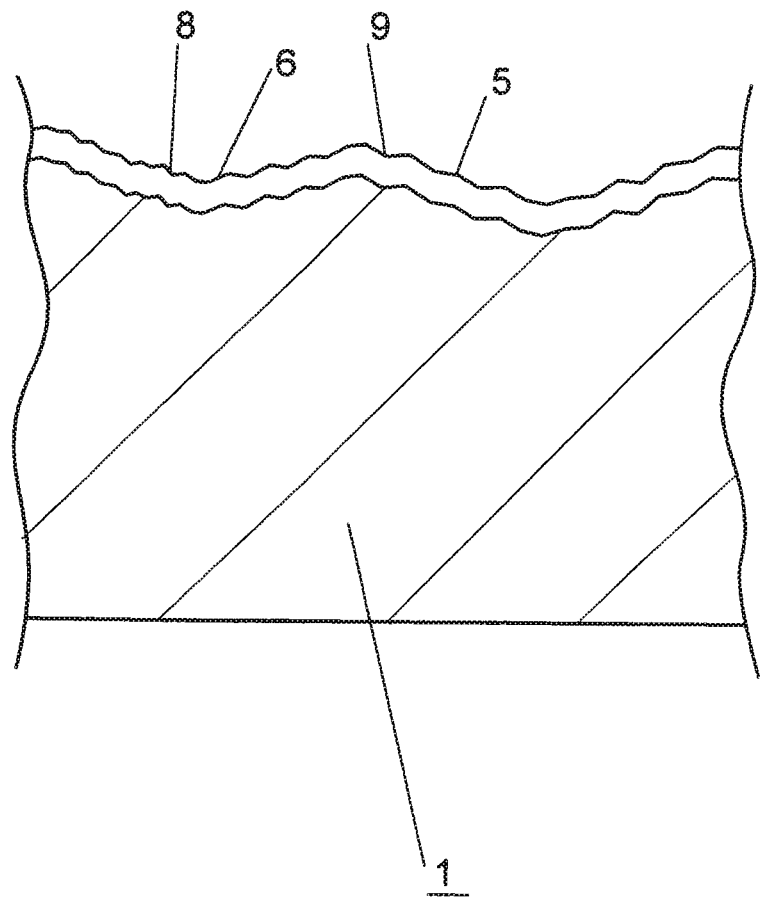
Figure 4:
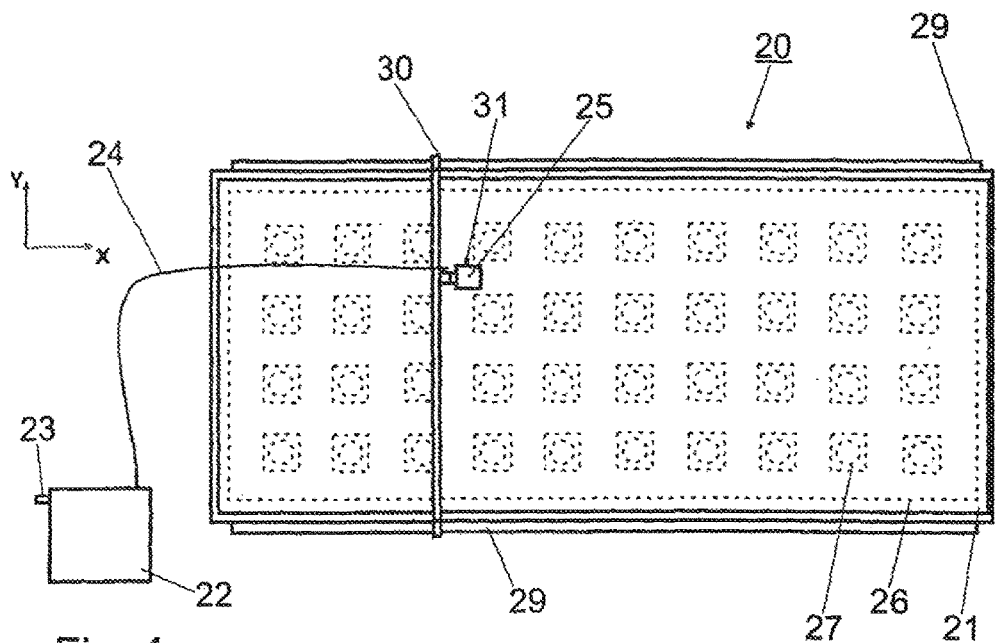
Figure 5:
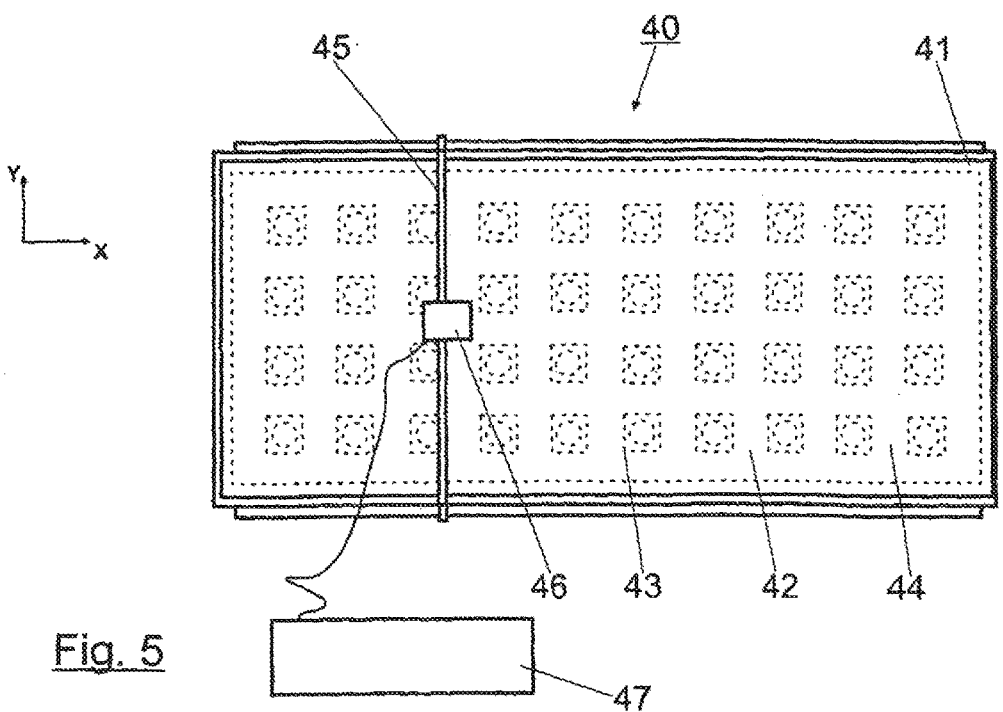

FIG. 1 is a perspective view Illustrating a pressing plate with surface structuring, FIG. 2 is a cross-section on a larger scale illustrating the pressing plate with structuring from FIG. 1, FIG. 3 is a view in cross-section on a very much larger scale illustrating the pressing plate from FIG. 1 with micro-structuring, FIG. 4 is a plan view illustrating a first device for implementing the method proposed by the invention and FIG. 5 is a plan view of a second device for implementing the method proposed by the invention.

FIG. 1 is a perspective view illustrating a pressing plate 1 with surface structuring which may be made from a steel or brass sheet. The surface 2 of the pressing plate 1 has been provided with a wood grain pattern 3, which was produced by applying a mask followed by etching, for example. Alternatively, another option is to produce the structuring on the surface 2 by means of a water jet device or a laser and a co-operating control unit.

A peripheral edge 4 is used for holding and gripping purposes in a single or multi-stage hydraulic press, although the latter is not illustrated.

FIG. 2 is a view in section illustrating the pressing plate 1 with a wood grain pattern 3. Being shown on a larger scale, it is clear that the wood grain pattern 3 consists of higher regions 5 and deeper lying regions 6 which are made by means of an etching process, a laser treatment or a process involving a water jet, for example. Applied to this wood grain pattern 3 in addition is a hard chrome layer 7 which, in the embodiment illustrated as an example, was applied to the full surface of the pressing plate 1. Alternatively, another option is to apply an another hard chrome plating in partial regions, for example in the deeper lying regions 6 or the higher regions 5 of the wood grain pattern 3 in addition.

FIG. 3 is a diagram in section on a much larger scale illustrating the pressing plate 1 with the wood grain pattern 3 and micro-structuring 8 produced by the method proposed by the invention to obtain a hydrophobic or superhydrophobic surface topography, making it much more difficult for dirt particles to adhere to the surface of end products made with it, for example material plates, and thereby making cleaning easier. The micro-structuring 8 is also covered by hard chrome plating 9 in order to increase the durability of the pressing tools. Again in this instance, chrome plating 9 may be applied to at least certain regions on top of the existing hard chrome plating 9 in order to impart a different degree of gloss to the surface of the deeper lying regions 6 or the raised regions 5.

FIG. 4 is a plan view of a device 20 for implementing the method proposed by the invention having a water jet nozzle as a processing head. The device comprises a water tank 21 in which a support device 26 is disposed. The support device 26 is provided with orifices in which suction means 27 are disposed, which might be suction orifices with a rubber elastic seal or suction cups. Accordingly, the pressing plate 1, the surface 2 of which is to be processed, can be fixed on the support device 26 by its full surface. The device further comprises a high-pressure pump unit 22 with connecting lines 23. The high-pressure pump unit 22 is supplied with water via the connecting lines 23. The water may be recycled water that been used previously for applying surface structuring to the workpiece 1. The water is delivered via a water intake element 24 to a processing head 25. An abrasive agent can be delivered via an abrasive agent connector 31 to the processing head 25 which is sucked in by the rapidly flowing water in the water nozzle so that a jet of water-abrasive agent is emitted from the water nozzle.

The processing head 25 is moved in the x direction with the aid of two guide rails 29 disposed in the x direction. With the aid of another guide rail 30 in the y direction, which is mounted so as to be displaceable on the guide rails 29 in the x direction, the processing head 25 is moved in the y direction, being mounted so as to be displaceable on the guide rail 30 in the y direction. If the device were designed, accordingly, it would also be possible to provide only one guide rail in the x direction. By superimposing the movements parallel with the guide rails 28, 29, the processing head 25 is able to travel to every position (x, y) of the surface 2. As proposed by the invention, the abrasion depth at the position (x, y) of the surface 2 is controlled on the basis of the driving speed of the processing head 25 in the x and/or y direction, the water pressure, flow volume, irradiation time or the distance between the surface 2 and processing head 25 and the detected data of the grayscale bitmaps is used for this purpose.

FIG. 5 is a plan view illustrating a device 40 for implementing the method proposed by the invention with the processing head or a printer unit. The device 40 comprises a support table 41 with a flat working surface 42. Within the working surface 42 are recesses which are connected to a vacuum pump to apply suction to a pressing plate 1 placed on the working surface 42 so that it can be fixed in position during processing. A processing head 46 can be moved in the direction of the Y co-ordinates by means of a cross-member 45. The cross-member 45 can also be moved in the direction of the X co-ordinates and the processing head 46 is therefore able to reach every point of the surface of the pressing tool 44. Instead of moving the processing head 46, it would also be possible for the processing head to remain stationary, in which case the working surface 42 with the pressing tool 44 laid on it is moved in the X and Y direction.

The movements of the cross-member 45 and processing head 46 are controlled by means of a control unit 47 which receives its data from the grayscale bitmaps. The processing head may be a print head, for example, in order to apply a mask to the surface of the pressing tool 44. The pressing tool 44 can then be etched. Alternatively, another option is to use an abrasive processing head, for example a laser which can likewise be moved by the control unit 47 into every position in the X and Y plane in order to apply structuring by laser to the surface of the pressing tool 44, and again the detected grayscale bitmap data is used for this purpose.

The same device 40 may also be used to process a pressing plate provided with an etch-resistant protective layer. The laser can burn out of the existing protective layer certain regions that are intended to be etched. These are preferably round or circular etchings provided with a view to etching the micro-structuring which realistically mimic the natural surfaces used. In this particular instance, it is preferable to used infrared lasers which are used merely to burn away the protective layer whilst leaving the metal surface of the pressing tool largely intact. The etchings in this instance may be spaced apart from one another but may also touch one another or overlap in the circumferential region.

LIST OF REFERENCE NUMBERS

1. Pressing plate
2. Surface
3. Wood grain pattern
4. Edge
5. Region
6. Region
7. Hard chrome layer
8. Micro-structuring
9. Hard chrome plating
20. Device
21. Water tank
22. High-pressure pump unit
23. Connecting line
24. Water intake element
25. Processing head
26. Support device
27. Suction means 28. Guide rail
29. Guide rail
30. Guide rail
40. Device
41. Support table
42. Working surface
43. Recess
45. Cross-member
46. Processing head
47. Control unit

The invention claimed is:

1. Method for producing a hydrophobic or superhydrophobic surface topography on a smooth or structured surface of a pressing tool in the form of a pressing plate, endless belt, or an embossing roller for producing material plates, plastic films, separating films, PVC-surfaces and LVTs (luxury vinyl tiles), comprising the steps:
preparing a surface template having a microstructure,
making an impression of the surface via a resin,
scanning the molded surface via a 3-D microscope,
converting the digitized data from the scanning process with depth measurement to grayscale bitmaps,
using the grayscale bitmaps to control the treatment process of an abrasive surface treatment or to apply a mask for chemically processing the pressing tool in order to produce the hydrophobic or superhydrophobic surface topography.

2. Method according to claim 1, wherein the grayscale bitmaps are used to apply a mask on the basis of a digitized printing process in readiness for other surface treatments.

3. Method according to claim 1, wherein the surface of the pressing tool is chemically processed after applying the mask and the duration of the etching process is determined on the basis of the detected depth of the surface template.

4. Method according to claim 1, wherein the surface of the pressing tool is provided at least partially with an etch-resistant protective layer and then the protective layer is partially removed via a laser controlled by the grayscale bitmaps.

5. Method according to claim 1, wherein a metal surface of the pressing tool is exposed via the laser, which removes only a thickness of a protective layer covering the metal surface.

6. Method according to claim 1, wherein a protective layer covering the pressing tool is partially removed in order to impart micro-structuring in the form of approximately round or circular etchings and/or the etchings are spaced apart from one another, touch or partially overlap in the circumferential region.

7. Method according to claim 4, wherein the protective layer is removed to the degree that a micro-structured surface is produced via an etching process and the duration of the etching process is determined on the basis of the detected depth of the surface template.

8. Method according to claim 1, wherein an abrasive processing of the surface of the pressing tool takes place and a dwell time of an abrasive tool or a dwell time, focus, and/or intensity of a laser beam are determined on the basis of the grayscale bitmaps.

9. Method according to claim 1, wherein
a subsequent surface treatment takes place via electro-polishing or mechanical polishing and/or
a full-surface and/or partial hard chrome plating of the surface topography is applied as a subsequent surface treatment and/or
a full-surface or partial adjustment of the degree of gloss takes place as a subsequent surface treatment.

10. Method according to claim 1, wherein an epoxy resin or silicone resin is used to make the impression.

11. Method according to claim 4, wherein the surface of the pressing tool is provided across the whole surface with the etch-resistant protective layer.

12. Method according to claim 8, wherein the data detected from the depth measurement via the 3-D microscope is used to determine the dwell time of the abrasive tool or the dwell time, focus, and/or intensity of the laser beam.

* * * * *